US008701132B2

(12) United States Patent
Kawabata (10) Patent No.: US 8,701,132 B2
(45) Date of Patent: Apr. 15, 2014

(54) MOVEMENT MECHANISM AND OPTICAL DISC APPARATUS

(75) Inventor: Toru Kawabata, Osaka (JP)

(73) Assignee: Panasonic Corporation, Kadoma-shi (JP)

(*) Notice: Subject to any disclaimer, the term of this patent is extended or adjusted under 35 U.S.C. 154(b) by 0 days.

(21) Appl. No.: 13/256,634

(22) PCT Filed: Feb. 28, 2011

(86) PCT No.: PCT/JP2011/001152
§ 371 (c)(1),
(2), (4) Date: Sep. 15, 2011

(87) PCT Pub. No.: WO2012/117436
PCT Pub. Date: Sep. 7, 2012

(65) Prior Publication Data
US 2013/0332944 A1    Dec. 12, 2013

(51) Int. Cl.
*G11B 17/03*    (2006.01)
*H02K 7/06*    (2006.01)

(52) U.S. Cl.
USPC .................................... 720/695; 310/49.47

(58) Field of Classification Search
CPC ............................ H02K 7/116; H02K 7/1166
USPC ..................... 720/695; 310/49.47
See application file for complete search history.

(56) References Cited

U.S. PATENT DOCUMENTS

| | | | |
|---|---|---|---|
| 5,191,575 A * | 3/1993 | Kido | 369/223 |
| 6,249,495 B1 * | 6/2001 | Okada et al. | 369/44.28 |
| 6,445,673 B2 * | 9/2002 | Park | 720/675 |
| 6,654,321 B2 * | 11/2003 | Okada et al. | 369/44.28 |
| 6,680,729 B1 * | 1/2004 | Shahoian et al. | 345/156 |
| 7,085,200 B2 * | 8/2006 | Okada et al. | 369/30.1 |
| 2006/0284496 A1 * | 12/2006 | Mizumaki | 310/49 R |

FOREIGN PATENT DOCUMENTS

| | | |
|---|---|---|
| JP | H09-051695 A | 2/1997 |
| JP | 2004-248449 A | 9/2004 |
| JP | 2009-086427 A | 4/2009 |
| JP | 2011-034609 A | 2/2011 |

* cited by examiner

*Primary Examiner* — Angel Castro
(74) *Attorney, Agent, or Firm* — Judge Patent Associates (57) ABSTRACT

The present invention provides a movement mechanism that is capable of easily releasing a bite-in state of a feed screw and a rack without increasing the size or the cost of an apparatus and without breaking the movement mechanism. A movement mechanism according to the present invention linearly moves a movement object, and includes: a feed screw; a drive motor for rotating the feed screw; a drive section for supplying a drive pulse to the drive motor; a movement member for linearly moving the movement object along with the rotation of the feed screw by the drive motor, the movement member being engaged with the feed screw; a detection section for detecting a situation in which the movement object is not moving; and a control section for, when the detection section has detected a situation in which the movement object is not moving, causing the drive section to output a drive pulse that causes the drive motor to rotate and vibrate.

5 Claims, 6 Drawing Sheets

MOVEMENT MECHANISM AND OPTICAL DISC APPARATUS

TECHNICAL FIELD

The present invention relates to a movement mechanism for linearly moving a movement object, by using a motor and a feed screw.

BACKGROUND ART

In optical apparatuses or optical disc apparatuses, a movement mechanism capable of controlling the position of a lens with a high accuracy is used. The movement mechanism includes, for example, a stepping motor, a feed screw that is rotated by the stepping motor, and a rack that engages with the feed screw. A lens holder for holding a lens is connected to the rack. If this movement mechanism is used, the amount of movement of the lens in the optical axis direction can be controlled in accordance with the amount of rotation of the stepping motor. As a result, it becomes possible to realize accurate positioning of the lens.

In such movement mechanisms using a stepping motor, an operation called origin search needs to be performed for determining the reference of rotation of the stepping motor, every time the movement mechanism is started. In the origin search, the rack or the lens holder is pressed against a predetermined reference object (stopper or the like), and the state of the stepping motor as it is at this time is defined as a reference. When the operation of pressing has been performed, it sometimes happens that the feed screw is tightened up and goes into a bite-in state, and that the rack or the lens holder cannot be pulled back from the pressed position. In addition, also when a shock is given from the outside, the rack and the feed screw can go into a bite-in state.

Patent Literature 1 discloses a method in which, when a movement mechanism becomes unable to operate owing to an occurrence of a bite-in state, a drive torque of a stepping motor is increased and the direction of rotation of the stepping motor is inversed, whereby a rack is forced to move and the movement mechanism recovers from the bite-in state.

CITATION LIST

Patent Literature

[PTL 1] Japanese Laid-Open Patent Publication No. 2009-86427

SUMMARY OF THE INVENTION

Problems to be Solved by the Invention

However, regarding the disclosure in Patent Literature 1 that a drive speed is decreased for increasing the drive torque, a phenomenon in which the drive torque increases by the drive speed decreasing is a characteristic realized when the movement mechanism is operating. In a state in which the movement mechanism does not operate at all, the drive torque does not always increase when a drive pulse rate is decreased as in the case where the drive speed is decreased. In addition, Patent Literature 1 discloses that a voltage or a current to be applied is increased for increasing the drive torque. However, in the case where a voltage or a current to be applied is increased to make the movement mechanism recover from the bite-in state, a voltage or a current several times as large as that in a normal use state is needed. In this case, it is necessary to select, in advance, a driver for generating such a voltage or a current several times as large as that in a normal use state, and a stepping motor that is capable of resisting the generated voltage or current, which results in increase in the size and the cost of an apparatus.

In addition, because the stepping motor is controlled such that its drive direction is inversed in Patent Literature 1, it is considered that Patent Literature 1 deals with the case where the feed screw goes into a bite-in state at a middle position other than an end position of the feed screw. For example, it is considered that Patent Literature 1 is intended to deal with a bite-in state occurring when a strong shock is given from the outside to an apparatus such as cameras used in outdoors by being dropped. Therefore, in the case where a bite-in state has occurred at the end position of the feed screw when, for example, the operation of pressing is performed in the origin search, if the drive torque is increased and the drive direction is inversed as in Patent Literature 1, there is a possibility that the bite-in state is deteriorated and the movement mechanism is broken.

Therefore, an object of the present invention is to provide a movement mechanism and an optical disc apparatus that are capable of easily releasing a bite-in state of a feed screw and a rack without increasing the size or the cost of an apparatus and without breaking the movement mechanism.

Solution to the Problems

The present invention relates to a movement mechanism for linearly moving a movement object. The movement mechanism comprises: a feed screw; a drive motor for rotating the feed screw; a drive section for supplying a drive pulse to the drive motor; a movement member for linearly moving the movement object along with the rotation of the feed screw by the drive motor, the movement member being engaged with the feed screw; a detection section for detecting a situation in which the movement object is not moving; and a control section for, when the detection section has detected a situation in which the movement object is not moving, causing the drive section to output a drive pulse that causes the drive motor to rotate and vibrate.

In addition, the present invention relates to an optical disc apparatus. The optical disc apparatus comprises: a spherical aberration correction lens; a lens holder for holding the spherical aberration correction; a feed screw; a drive motor for rotating the feed screw; a drive section for supplying a drive pulse to the drive motor; a movement member for linearly moving the movement object along with the rotation of the feed screw by the drive motor, the movement member being engaged with the feed screw; a detection section for detecting a situation in which the movement object is not moving; and a control section for, when the detection section has detected a situation in which the movement object is not moving, causing the drive section to output a drive pulse that causes the drive motor to rotate and vibrate.

Advantageous Effects of the Invention

According to the present invention, it becomes possible to realize a movement mechanism and an optical disc apparatus that are capable of easily releasing a bite-in state of a feed screw and a rack occurring when a shock is given from the outside or when an operation of pressing in origin search is performed, without increasing the size or the cost of an apparatus and without breaking the movement mechanism.

BEST MODE FOR CARRYING OUT THE INVENTION

Figure 1:
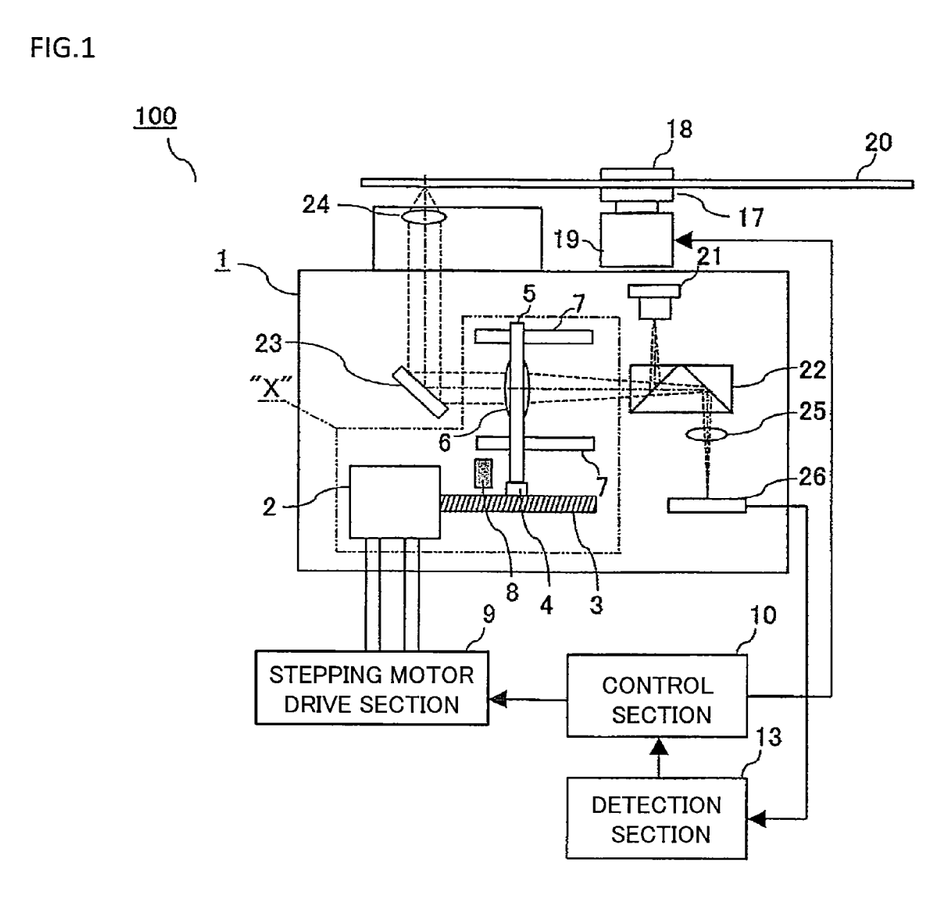
FIG. 1 is a function block diagram showing a schematic configuration of an optical disc apparatus according to an embodiment.
Figure 2:
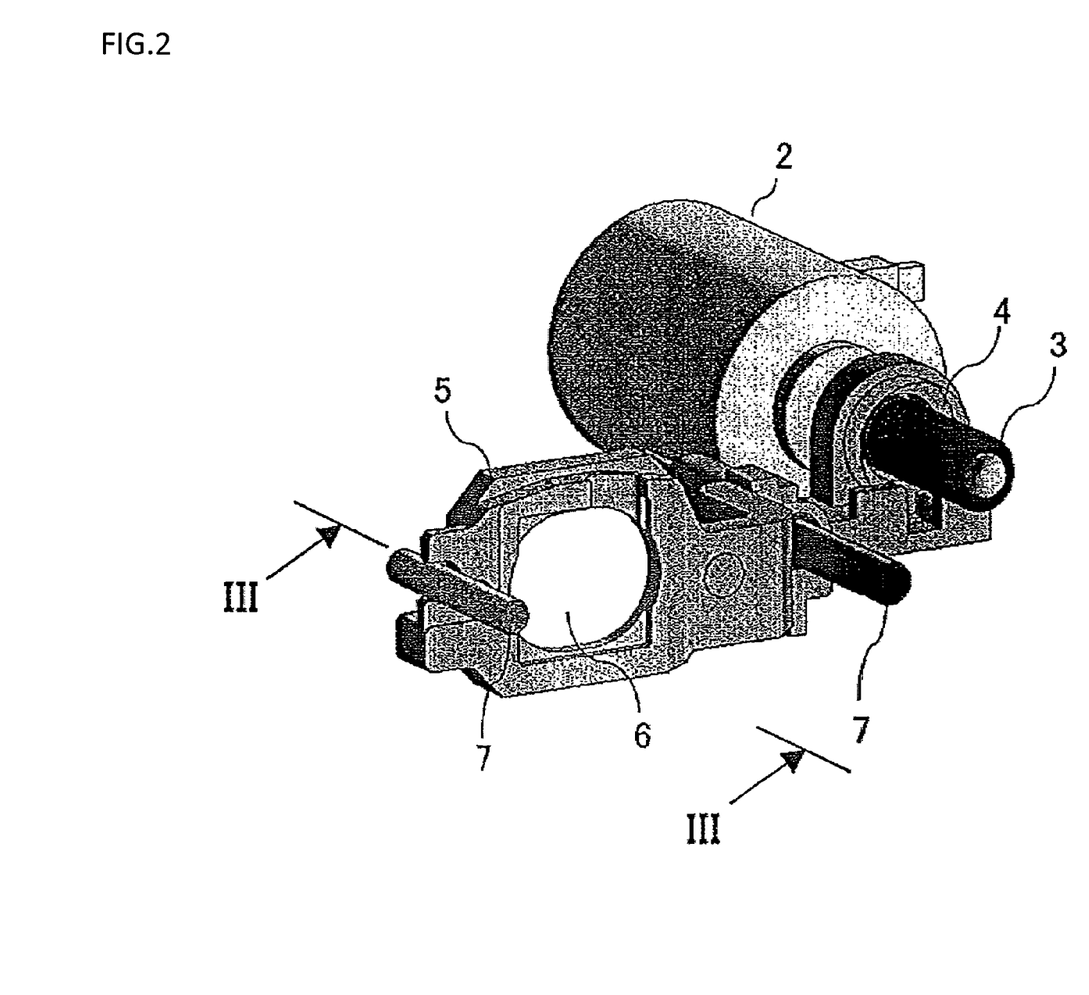
FIG. 2 is a perspective view showing a specific example of a portion indicated by mark X shown in FIG. 1.
Figure 3:
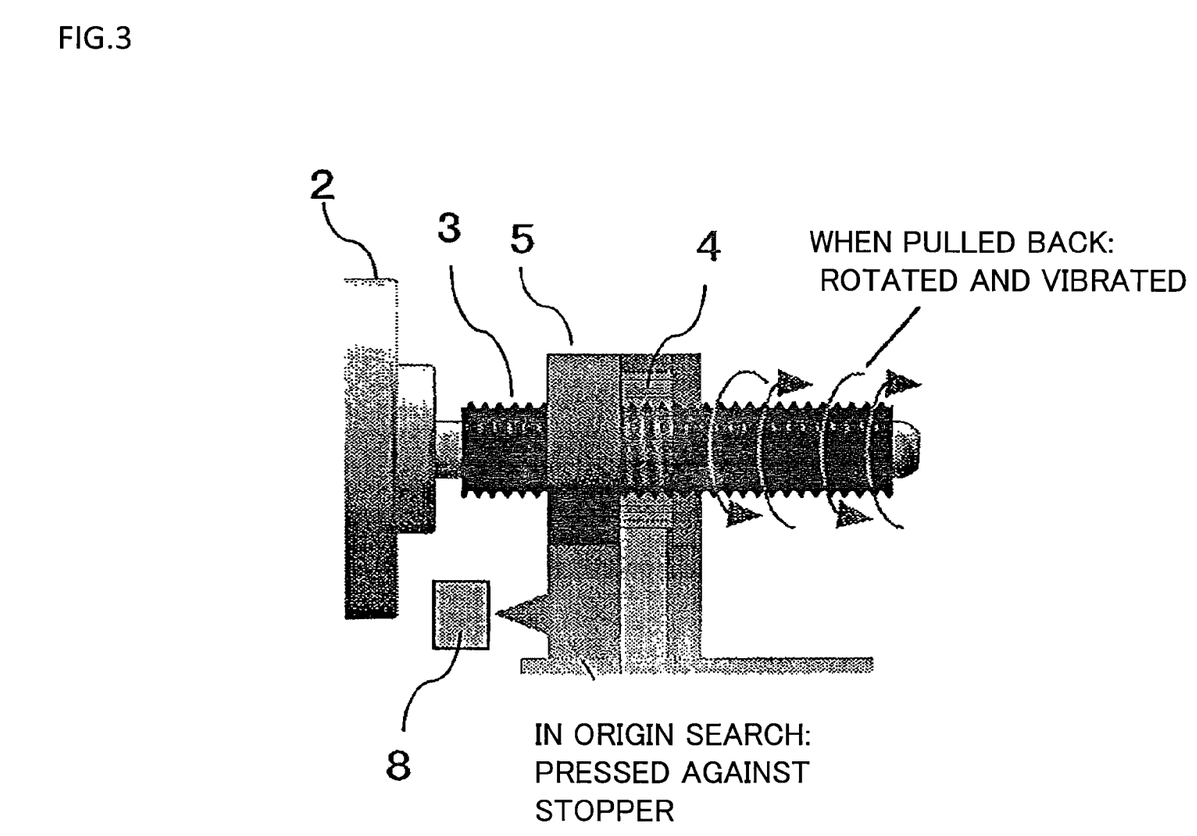
FIG. 3 is a view seen from line III-III in FIG. 2.

FIG. 1 is a function block diagram showing a schematic configuration of an optical disc apparatus according to an embodiment. FIG. 2 is a perspective view showing a specific example of a portion indicated by mark X shown in FIG. 1. FIG. 3 is a view seen from line III-III in FIG. 2.

An optical disc apparatus 100 includes an optical pickup 1, a stepping motor drive circuit 9, a control section 10, a detection section 13, a turn table 17, a clamper 18, and a motor 19. An optical disc 20 placed on the turn table 17 is held by the clamper 18, and is rotated by the motor 19.

The optical pickup 1 forms a spot on an information storage surface of the optical disc 20 to perform at least one of operations of storing, reproducing, and deleting information in the optical disc 20. The optical pickup 1 at least includes a light source 21, a beam splitter 22, a collimation lens 6, a reflection mirror 23, an object lens 24, a condenser lens 25, and a light receiving device 26. A light flux emitted from the light source 21 passes through the beam splitter 22, the collimation lens 6, the reflection mirror 23, and then the object lens 24, to be focused on the optical disc 20. The light flux reflected by the optical disc 20 passes through the reflection mirror 23, the collimation lens 6, and then the beam splitter 22, to be focused on a light receiving surface of the light receiving device 26 by the condenser lens 25. In accordance with the intensity of the light received by the light receiving device 26, a tracking error (TE) signal or a focus error (FE) signal is generated.

The collimation lens (spherical aberration correction lens) 6 moves in a direction parallel to its optical axis to vary the parallelism of the emitted light flux, thereby correcting a spherical aberration due to an error in the thickness of a protection layer of the optical disc 20, or in a storage medium having a plurality of storage layers, correcting a spherical aberration due to a variation in the thickness of a protection layer according to the depths of the plurality of storage layers. Therefore, the collimation lens 6 and a collimation lens holder 5 for holding the collimation lens 6 are guided by a pair of shafts 7 such that the collimation lens 6 and the collimation lens holder 5 can linearly move in a direction parallel to the optical axis of the collimation lens 6.

As shown in FIGS. 1 to 3, a movement mechanism includes: a stepping motor 2; a feed screw 5 that can be rotated by the stepping motor 2; a rack 4 that is engaged with the feed screw 5 so as to move in a straight line along with the rotation of the feed screw 5 and is connected to the collimation lens holder 5; a stopper 8; a stepping motor drive section 9; a control section 10; and a detection section 13. The stopper 8 is a physical reference against which the collimation lens holder 5 is pressed to stop the collimation lens holder 5 in origin search of the stepping motor 2 performed when the optical disc apparatus 100 is started, for example.

The stepping motor drive section 9 generates a drive pulse for driving the stepping motor 2 in accordance with an instruction from the control section 10, and outputs the generated drive pulse to the stepping motor 2.

The detection section 13 detects that the rack 4 has bit into the feed screw 5, based on a tracking error signal or a focus error signal outputted from the light receiving device 26. A specific method for the detection will be described later.

The control section 10 includes, for example, a microprocessor and a memory, and controls the entirety of the optical disc apparatus 100. More specifically, if the detection section 13 has detected the bite-in state of the rack 4, the control section 10 causes the stepping motor drive section 9 to output a drive pulse having a resonance frequency of the stepping motor 2 or a frequency close to the resonance frequency, thereby rotating and vibrating the stepping motor 2 at the resonance frequency. Alternatively, the control section 10 may cause the stepping motor drive section 9 to output a drive pulse sweeping a predetermined range of frequencies. In addition, the control section 10 also controls the drive of the motor 19 rotating the optical disc 20.

It is noted that in the case where the present invention is applied to an optical pickup apparatus as in the present embodiment, a general purpose optical pickup apparatus control IC may be used as the control section 10 and the detection section 13. In addition, in FIG. 1, for the purpose of facilitating the description, the control section 10 and the detection section 13 are shown as separate function blocks, but the function of the detection section 13 may be realized by the control section 10.

Here, the method for detecting a bite-in state based on a tracking error signal or a focus error signal will be described.

If a focus servo operation is performed for the optical disc 20 set on the turn table 17 of the optical disc apparatus 100 while the laser light source 21 of the optical pickup 1 is made to emit light at a reproduction power, a minute light focused spot is formed on the optical disc 20. The optical disc 20 has a plurality of grooves on an information storage surface thereof. The plurality of grooves are formed such that a tracking error signal for controlling the tracking servo operation allowing the light focused spot to accurately trace will be outputted. The tracking error signal has a value almost proportional to a displacement of the position of the light focused spot from the center line of the groove. When a displacement of the position of the light focused spot becomes large, normally, the value of the tracking error signal is saturated at a certain value. Since the plurality of grooves have pitches of about 1 μm, if the light focused spot sequentially crosses the plurality of grooves, the value of the tracking error signal becomes large to be saturated as the light focused spot is separated from the center line of a groove, and the value of the tracking error signal becomes small as the light focused spot comes close to the center line of the next groove. Therefore, the tracking error signal becomes a sine wave signal varying in its amplitude, as the light focused spot sequentially crosses the plurality of grooves. Since the amplitude of the tracking error signal is influenced by an aberration of the light focused spot on the optical disc 20, the amplitude of the tracking error signal varies in accordance with a movement of the collimation lens 6 in the optical axis direction. By using this characteristic, if a variation in the amplitude of the tracking error signal is measured while the position of the collimation lens 6 is moved, for example, three times, whether or not the rack 4 is in a bite-in state can be detected. In this case, if the amplitude of the tracking error signal does not vary, it is found that the rack 4 is in a bite-in state.

Figure 4:
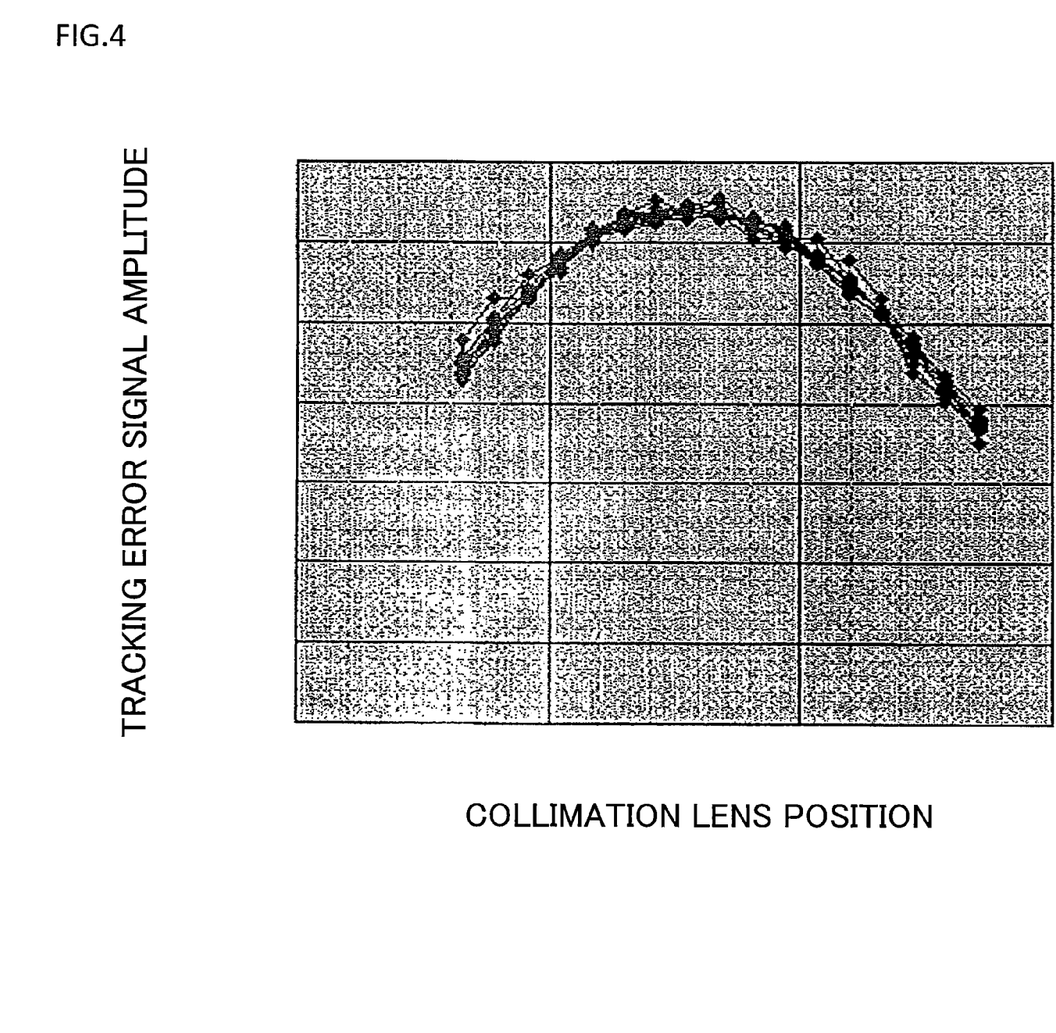
FIG. 4 is a diagram showing the relationship between the position of the collimation lens and the amplitude of the tracking error signal.

FIG. 4 is a diagram showing the relationship between the position of the collimation lens and the amplitude of the tracking error signal.

In some standards of the optical disc 20, an operation of measuring, in advance, the relationship between the position of the collimation lens and the amplitude of the tracking error signal is performed in every optical disc as shown in FIG. 4 for the purpose of detecting an optimum position of the collimation lens. In the case where this operation of measurement is performed, the bite-in state of the rack 4 may be detected based on the measured relationship shown in FIG. 4.

It is noted that the amplitude of a focus error signal also varies in accordance with a movement of the collimation lens. Therefore, instead of the tracking error signal, the focus error signal is used for detecting a bite-in state.

Figure 5:
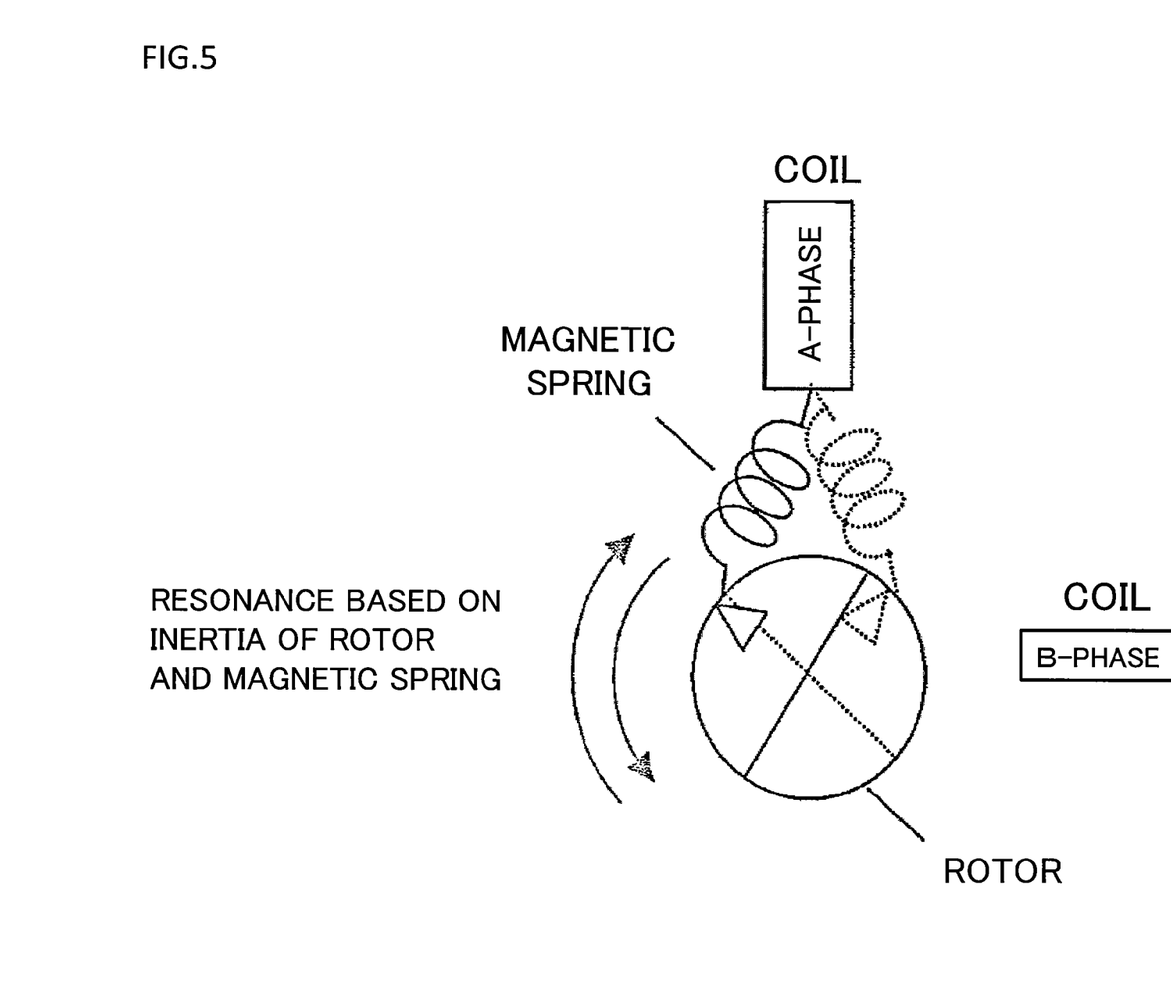
FIG. 5 is a conceptual diagram showing the principle of a resonance based on a rotor inertia and a magnetic spring.

FIG. 5 is a conceptual diagram showing the principle of a resonance based on a rotor inertia and a magnetic spring.

In the stepping motor, an electromagnetic force occurring between a rotor and a coil acts as a kind of magnetic spring. Owing to the magnetic spring and the moment of inertia of the rotor, a resonance occurs at a specific frequency. In a normal drive state, this resonance can generate an unnecessary vibration when the stepping motor is driven at a specific rotation speed, and can come out of synchronism because of the generated unnecessary vibration. In this way, the resonance causes troubles. However, in the case where the stepping motor is to be driven so as to rotate and vibrate, a large amplitude of vibration can be obtained by driving the stepping motor at a resonance frequency.

Figure 6:
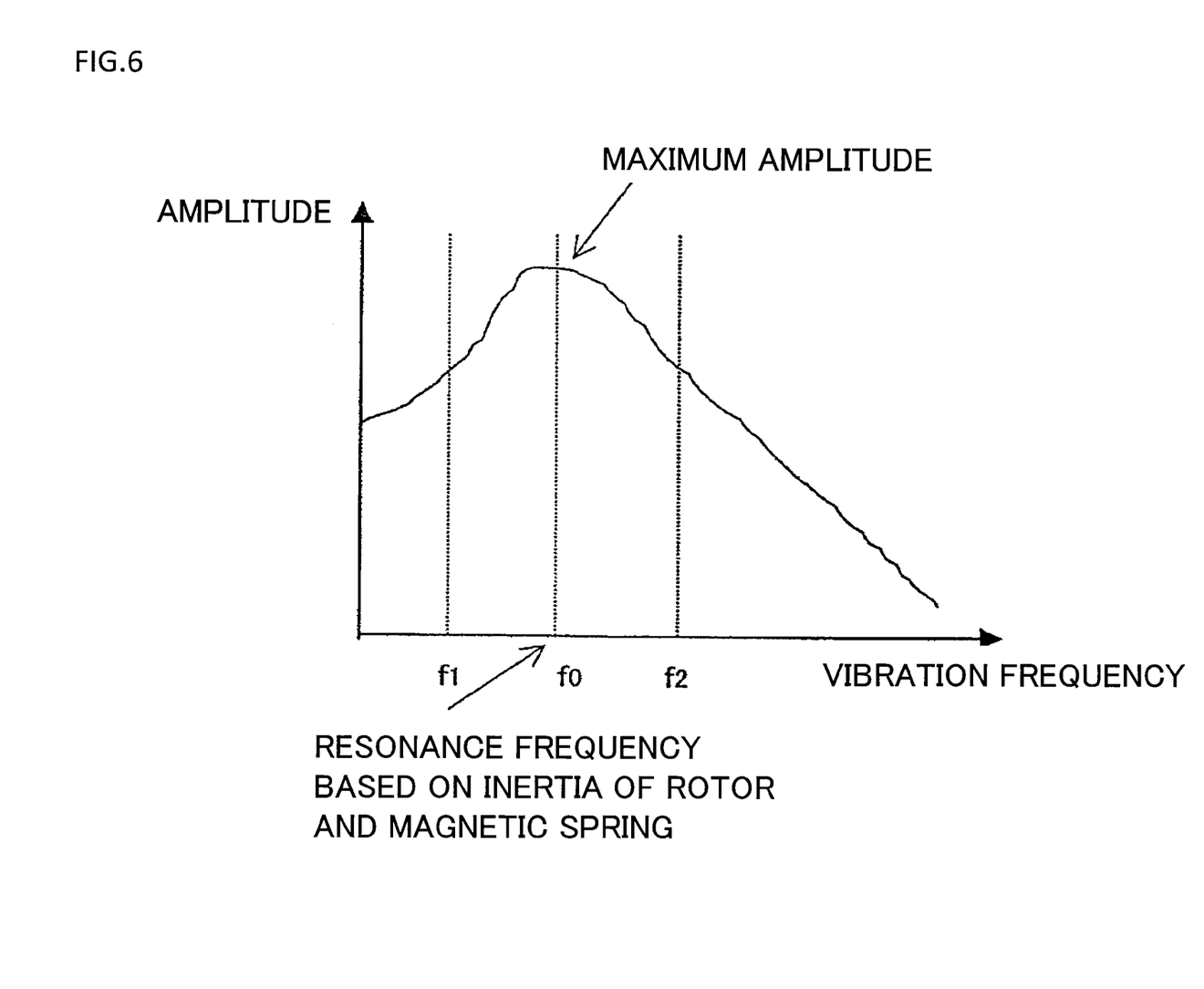
FIG. 6 is a diagram showing the relationship between the frequency of a rotational drive pulse given to the stepping motor, and the amplitude of a vibration occurring in the stepping motor.

FIG. 6 is a diagram showing the relationship between the frequency of a rotational drive pulse given to the stepping motor, and the amplitude of a vibration occurring in the stepping motor.

As shown in FIG. 6, when a rotational drive pulse having a frequency equal to a resonance frequency $f_0$ based on the rotor inertia and the magnetic spring is given to the stepping motor, the amplitude of the vibration has a maximum value. By using this characteristic, a bite-in state of the rack 4 to the feed screw 5 occurring when the collimation lens holder 5 is pressed against the stopper 8 for performing origin search of the stepping motor, or when a shock is given from the outside, is released.

Specifically, with reference to FIG. 1, if the detection section 13 has detected a bite-in state, the control section 10 outputs, to the stepping motor drive section 9, a signal causing the stepping motor drive section 9 to output a drive pulse having the resonance frequency $f_0$ or a frequency close to the resonance frequency $f_0$. As a result, the amplitude of the vibration of the stepping motor 2 becomes large, and the bite-in state of the rack 4 to the feed screw 5 is released.

Preferably, the control section 10 causes the stepping motor drive section 9 to output a drive pulse sweeping a predetermined range of frequencies (for example, f1 to f2 in FIG. 6) including the resonance frequency $f_0$, instead of giving the drive pulse having the resonance frequency $f_0$ or a frequency close to the resonance frequency $f_0$ to the stepping motor 2. In this case, even if the resonance frequency $f_0$ is not known in advance, there is an error in the resonance frequency $f_0$ due to individual difference of the stepping motor 2, or the resonance frequency $f_0$ differs among the types of the stepping motor 2, the stepping motor 2 can be rotationally driven at the resonance frequency $f_0$ by sweeping the frequencies, whereby it is ensured that a bite-in state of the rack 4 is released. In addition, more preferably, the control section 10 may sweep the predetermined range of frequencies a plurality of times. In this case, the stepping motor 2 is rotationally driven at the resonance frequency $f_0$ a plurality of times. Therefore, even if the rack 4 has strongly gone into a bite-in state, it is ensured that the bite-in state of the rack 4 is released.

It is noted that although in the present embodiment, the rack 4 is used as a movement member for moving the collimation lens holder 5, which is a movement object to be moved, engaged with the feed screw 5, a female screw engaging with the feed screw 5 may be used instead of the rack 4.

INDUSTRIAL APPLICABILITY

The present invention is applicable to a movement mechanism for linearly moving a movement object, and more particularly, to an optical disc apparatus and other optical apparatuses in which the position of an optical device needs to be accurately adjusted.

DESCRIPTION OF THE REFERENCE CHARACTERS 2 stepping motor
3 feed screw
4 rack
5 collimation lens holder
6 collimation lens
8 stopper
9 stepping motor drive section
10 control section
13 detection section
100 optical pickup apparatus

The invention claimed is:

1. A movement mechanism for linearly moving a movement object, the movement mechanism comprising:
a feed screw;
a drive motor for rotating the feed screw;
a drive section for supplying a drive pulse to the drive motor;
a movement member for linearly moving the movement object along with the rotation of the feed screw by the drive motor, the movement member being engaged with the feed screw;
a detection section for detecting a situation in which the movement object is not moving; and
a control section for, when the detection section has detected a situation in which the movement object is not moving, causing the drive section to output a drive pulse that causes the drive motor to rotate and vibrate.

2. The movement mechanism according to claim 1, wherein
the drive motor is a stepping motor, and
the control section, when the detection section has detected a situation in which the movement object is not moving, causes the drive section to output a drive pulse having a resonance frequency of the stepping motor or a frequency close to the resonance frequency.

3. The movement mechanism according to claim 2, wherein the resonance frequency of the stepping motor is based on the moment of inertia of a rotor that the stepping motor has, and a magnetic spring occurring between the rotor and a coil.

4. The movement mechanism according to claim 1, wherein the control section, when the detection section has detected a situation in which the movement object is not moving, causes the drive section to output a drive pulse sweeping a predetermined range of frequencies including the resonance frequency of the stepping motor.

5. An optical disc apparatus comprising:
a spherical aberration correction lens;
a lens holder for holding the spherical aberration correction lens;
a feed screw;
a drive motor for rotating the feed screw;
a drive section for supplying a drive pulse to the drive motor;
a movement member for linearly moving the movement object along with the rotation of the feed screw by the drive motor, the movement member being engaged with the feed screw;
a detection section for detecting a situation in which the movement object is not moving; and
a control section for, when the detection section has detected a situation in which the movement object is not moving, causing the drive section to output a drive pulse that causes the drive motor to rotate and vibrate.

* * * * *